Sept. 7, 1943. E. M. DOWD ET AL 2,328,713
GRASS SEED HARVESTER
Filed Aug. 22, 1941 3 Sheets-Sheet 1
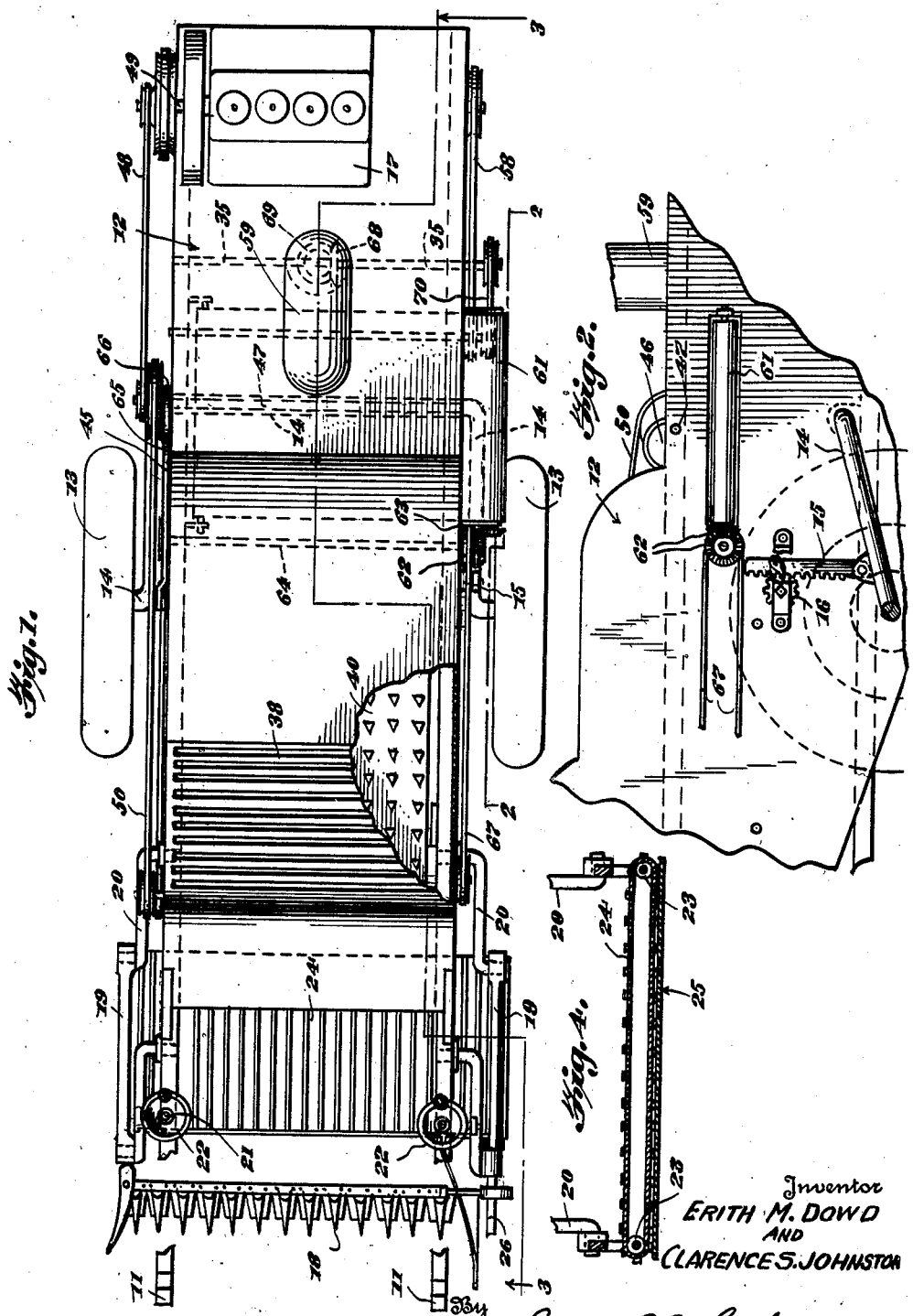
Inventor
ERITH M. DOWD
AND
CLARENCE S. JOHNSTON
By Irving L. McCathran
Attorney

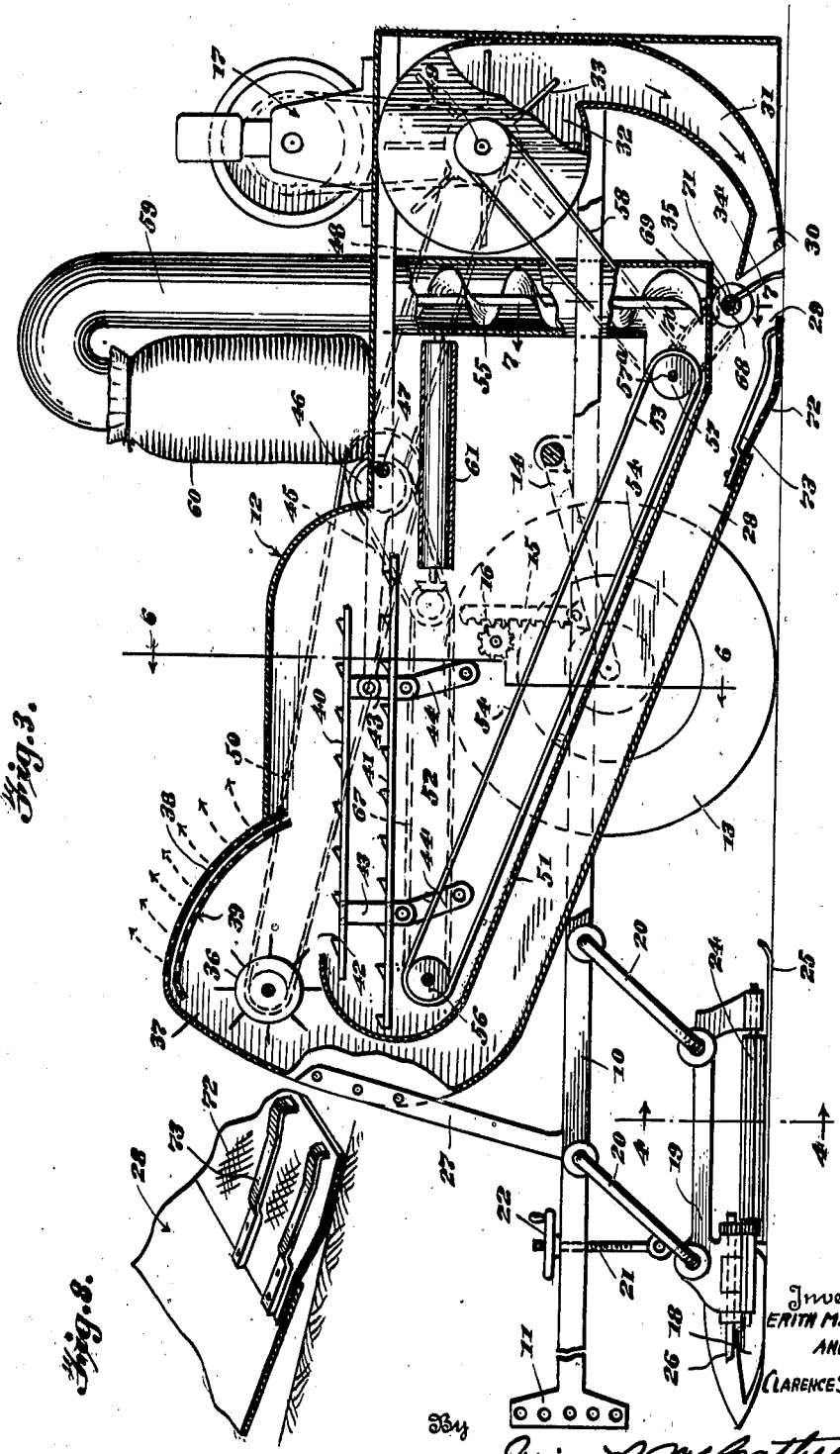

Sept. 7, 1943.   E. M. DOWD ET AL   2,328,713
GRASS SEED HARVESTER
Filed Aug. 22, 1941   3 Sheets-Sheet 3

Inventors
ERITH M. DOWD
AND
CLARENCE S. JOHNSTON
By Irving R. McCathran
Attorney Patented Sept. 7, 1943

2,328,713

UNITED STATES PATENT OFFICE 2,328,713

GRASS SEED HARVESTER

Erith M. Dowd and Clarence S. Johnston, Amarillo, Tex.; Camma L. Johnston executrix of said Clarence S. Johnston, deceased Application August 22, 1941, Serial No. 407,970

4 Claims. (Cl. 56—126)

This invention relates to grass seed harvesters, and more particularly to a harvester for harvesting buffalo grass seed.

One of the principal objects of this invention is the production of a simple and efficient means for blowing seed which is lying upon the ground, into the machine as the machine passes over the ground.

A further object of this invention is the production of a buffalo grass seed harvester which is so constructed as to efficiently pick up the seed lying upon the ground by means of a blowing device for blowing the seed into the machine, then thrashing the seed and finally bagging the seed.

Other objects and advantages of the present invention will appear throughout the following specification and claims.

In the drawings:

Figure 1 is a top plan view of the harvester, certain parts being shown in section;

Figure 2 is a fragmentary side elevational view;

Figure 3 is a longitudinal sectional view taken on line 3—3 of Figure 1;

Figure 4 is a vertical sectional view taken on line 4—4 of Figure 3;

Figure 8 is a fragmentary sectional perspective view of a portion of the canvas belting strip carried by the lower end of the runway.

Figure 5:
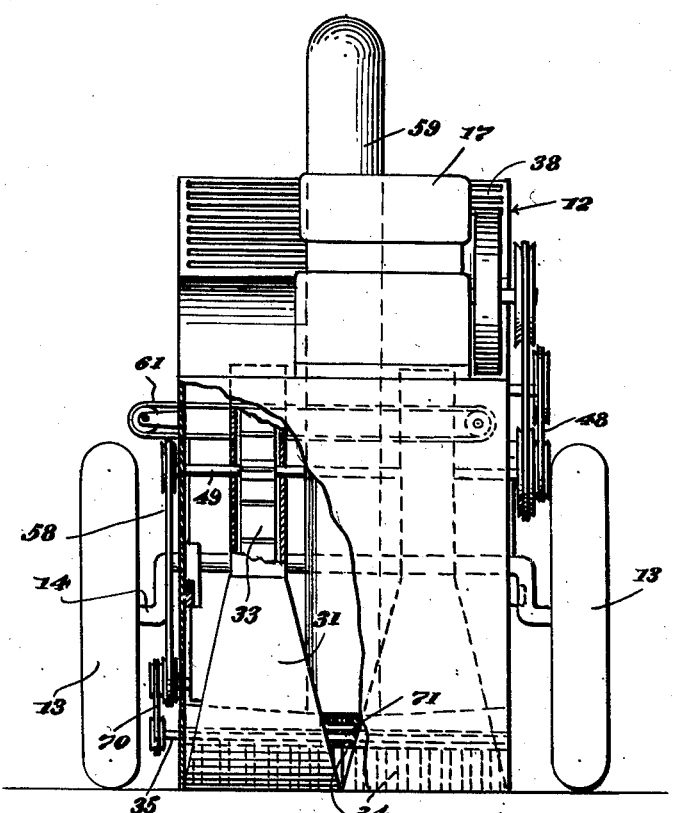
Figure 5 is a rear elevational view, certain parts being shown in section.
Figure 6:
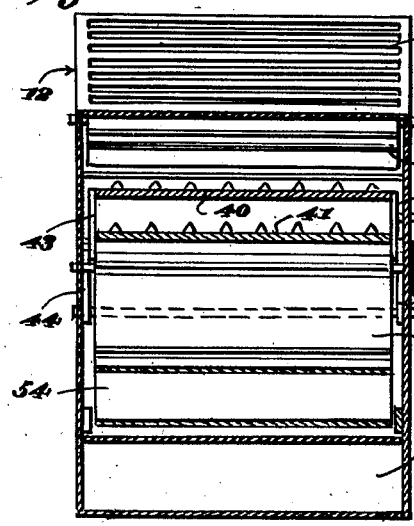
Figure 6 is a vertical sectional view taken on line 6—6 of Figure 3.
Figure 7:
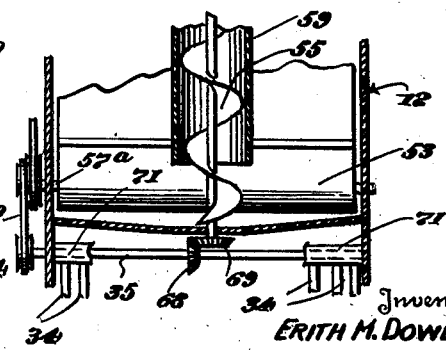
Figure 7 is a fragmentary vertical sectional view taken on line 7—7 of Figure 3.

By referring to the drawings, it will be seen that 10 designates the frame of the grass seed harvester which is provided with a suitable tractor or draft hitch 11 at its forward end. The frame 10 supports a body 12, which body carries the operating mechanism of the harvester, as hereinafter described. A pair of supporting wheels 13 support a crank axle 14, which crank axle supports the frame 10, as shown in Figure 3. A vertical rack 15 is carried by the axle 14, in the manner as shown in Figure 2, and is engaged by a cog 16 which is controlled by a pawl of a suitable structure to facilitate raising and lowering of the frame 10 away from or toward the ground. The cog may be operated by a removable crank if desired, or may be operated in any conventional manner. The pawl is adapted to hold the cog 16 in a set position, as is usual with such a structure. A power plant 17 is carried at the rear end of the body 12, as shown in Figures 1 and 3.

A sickle bar 18, for cutting tall grass, is carried near the forward end of the frame 10 by a suspended frame 19, which frame 19 is hung from the frame 10 by means of the pivoted hanger arms 20. The suspended mower bar supporting frame 19 is adjustable vertically by means of the threaded rods 21 and threaded wheels 22 carried near the forward end of the frame 10. Rollers 23 are carried by the ends of the suspended frame 19, and a slatted endless conveyor 24 passes over the rollers 23 and transversely of the frame 19. A pan 25 is carried by the frame 19 below the conveyor 24 and the slats of the conveyor 24 are adapted to drag any loose seed off the pan 25 toward the right of the machine. The stems and weeds are conveyed to the left as they drop upon the top of the conveyor 24 after being cut by the sickle bar 18. The sickle bar 18 and conveyor 24 are driven from a suitable tractor located in front of the machine and connected to the shaft 26. The forward end of the body 12 is braced by means of a bracing arm 27, as shown in Figure 3.

The body 12 is provided with a forward and upwardly inclined runway 28 at the bottom of the body. This runway 28 is provided with an open lower rear end 29 and directly in the rear of and slightly spaced from the rear end 29 are the air blast discharge ends 30 of the blower tubes 31. These tubes 31 pass downwardly from the fan housings 32, in which housings 32 are mounted fans 33. The fans 33 are driven from the power plant 17. A plurality of vibrator spring fingers 34 are hung at 35 near the open rear end 29 of the runway 28 for rattling, raking, or shaking the seed loose from the stems of the grass as the machine passes over the cut grass which is lying upon the ground, so that the seed may be blown into the runway 28 by the air blast from the blower tube 31.

A threshing cylinder 36 is mounted in the upwardly curved end 37 of the runway 28, and the top wall of the body 12 at this point is perforated or slotted, as at 38. A slotted or perforated shield plate 39 is located just below the slotted top wall 38. This structure will permit the dust to escape and will provide means for lowering the air pressure which accumulates in the body 12 of the machine. A pair of vibrator sieves 40 and 41, one arranged above the other, are carried in the body 12 in the rear of and below the discharge end 42 of the runway 28. The sieves 40 and 41 are spaced by links 43, and these links 43 are supported upon the pivoted supporting links 44. A draw hitch or tongue 45 is connected at one end to one of the links 43, and at its other end to an eccentric 46 for vibrating the sieves 40 and 41. The eccentric 46 is carried by the shaft 47, and this shaft 47 is driven by a belt 48. The belt 48 is driven from the fan shaft 49. The cylinder 36 is driven from a belt 50 and a pulley carried by the shaft 47.

The upper wall 51 of the runway 28 constitutes a bottom downwardly inclined floor for the threshing compartment 52 of the body 12. An endless scraper belt 53 is mounted in parallel relation to the wall 51, and this belt 53 is provided with suitable cleats 54 to pick up the seed as the seed drops through the sieves 40 and 41. These cleats 54 also scrape the seed toward the lower end of the vertical screw conveyor 55, as shown in Figure 3, along the wall 51. The conveyor 53 passes over the rollers 56 and 57. The conveyor 53 is driven by the roller 57, which roller 57 is driven by a belt 58, the belt 58 being in turn driven from the shaft 49. The screw conveyor 55 is mounted in a vertical elevator tube 59, the lower end of which opens adjacent the lower end of the scraper belt 53. The upper end of the tube 59 is turned downwardly and supports a removable seed-receiving bag 60.

A canvas transversely extending conveyor belt 61 is mounted in the body 12 under the rear end of the sieves 40 and 41. The belt 61 extends outwardly beyond the left side of the body 12 to dump the stems of the grass to the left of the machine. This belt 61 is driven by the gears 62 and 63. The gear 62 is driven by a shaft 64, which shaft 64 is driven by a belt 65 from a pulley 66 carried by the shaft 47. The belt 53 is also driven by the belt 67.

The vertical screw conveyor 55 is driven by gears 68 and 69. The gear 68 is carried by a shaft 35, which shaft 35 is driven by the belt 70 from the shaft 57a which carries the roller 57. A sleeve 71 is carried by the shaft 35 and supports the fingers 34.

A strong canvas belting strip 72 extends transversely across the lower seed entrance end of the runway 28, and a plurality of spring fingers 73 are carried by the lower end of the runway 28 and contact the belting strip 72 and press downwardly thereon near its outer end. The fingers 73 hold the strip 72 in contact with the uneven ground and cause the strip 72 to hug to the uneven ground surface over which the machine passes. This structure will prevent the seed from blowing under or beyond the runway 28.

The operation of the machine is as follows:—

As the machine moves forwardly, the grass is cut by the sickle or mower bar 18, and the grass then falls upon the conveyor 24 which deposits the grass upon the ground to the left of the machine.

The seed from the grass lays upon the surface of the ground, and as the machine moves forwardly the air blast from the blower tubes 31 will blow the seed up through the runway 28, the belting strip 72 being held snugly in engagement with the surface of the ground. This strip 72, as explained above, will direct the seed up into the runway 28, and will prevent the seed from being blown under or beyond the runway. The spring fingers 34 in the meantime will rake and shake the seed from the stems of the grass lying upon the ground and facilitate the blowing of the seed up into the runway 28. As the seed is blown up through the runway 28, this seed will pass the threshing cylinder 36 which will assist in removing the seed from any particles of grass stems which may have been blown up the runway 28, and this material is then dropped upon the shaking sieves 40 and 41, the stems and other debris falling upon the conveyor 61 and the loose seed dropping upon the conveyor 53. The loose seed is then carried by the conveyor and scraped from the wall 51 toward the lower end of the elevator tube 59 by the screw conveyor 55 and bagged in the bag 60. The stems and other debris which falls upon the conveyor 61, which conveyor extends transversely of the body 12, will be deposited to the left of the machine and dropped upon the ground.

As previously explained, the wheels 13 may be adjusted by means of the cog 16 and rack bar 15 to regulate the position of the body and frame of the machine with respect to the ground. The sickle or mower bar 18 may also be adjusted as described by means of the threaded wheels 22 and threaded rods 21.

As the machine passes on its next round, the deposited debris and stems from which the seed has not as yet been totally removed will again be picked up by the air blast and forced up through the runway 28 and will then be carried through the same path of travel as previously described.

One of the important features of the present invention is, the principle of blowing the seed from the ground up through the runway 28 and into the body of the machine where the seed, stems and other debris, will be properly threshed to remove the seed from the stems and other debris.

Having described the invention, what we claim as new is:

1. A seed harvester comprising a body adapted to be moved over the surface of the ground upon which seed and stems of cut grain have been deposited, said body having an entrance opening in the bottom thereof for admitting cut grain, said entrance opening having front and rear ends, a flexible apron extending across one end of the entrance opening and contacting the ground, and a blower having a discharge opening located at the opposite end of the said entrance opening and spaced from the apron for blowing cut grain in an approximately horizontal plane across said entrance opening and upon said apron.

2. A seed harvester comprising a body adapted to be moved over the surface of the ground upon which seed and stems of cut grain have been deposited, said body having an entrance opening in the bottom thereof for admitting cut grain, said entrance opening having front and rear ends, a flexible apron extending across one end of the entrance opening and contacting the ground, a blower having a discharge opening located at the opposite end of the said entrance opening and spaced from the apron for blowing cut grain in an approximately horizontal plane across said entrance opening and upon said apron, and a raking means interposed between said discharge opening of said blower and said flexible apron.

3. A seed harvester comprising a body adapted to be moved over the surface of the ground upon which seed and stems of cut grain have been deposited, said body having an entrance opening in the bottom thereof for admitting cut grain, said entrance opening having front and rear ends, a flexible apron extending across one end of the entrance opening and contacting the ground, a blower having a discharge opening located at the opposite end of the said entrance opening and spaced from the apron for blowing cut grain in an approximately horizontal plane across said entrance opening and upon said apron, and yieldable means engaging said apron for yieldably holding the apron in contact with the ground and preventing the blast from said blower from lifting the apron.

4. A seed harvester comprising a body adapted to be moved over the surface of the ground upon which seed and stems of cut grain have been deposited, said body having an entrance opening in the bottom thereof for admitting cut grain, said entrance opening having front and rear ends, a flexible apron having an outer free end extending across one end of the entrance opening and contacting the ground, a blower having a discharge opening located at the opposite end of the said entrance opening and spaced from the apron for blowing cut grain in an approximately horizontal plane across said entrance opening and upon said apron, and yieldable spring fingers carried by said body and extending longitudinally of said apron and contacting the apron near its outer free end for flexibly holding the apron in contact with the ground.

ERITH M. DOWD.
CLARENCE S. JOHNSTON.